United States Patent [19]

Schipper

[11] Patent Number: 4,768,604

[45] Date of Patent: Sep. 6, 1988

[54] POWER STEERING SYSTEM

[75] Inventor: William R. Schipper, Clio, Mich.

[73] Assignee: General Motors Corporation, Detroit, Mich.

[21] Appl. No.: 69,818

[22] Filed: Jul. 6, 1987

[51] Int. Cl.⁴ ............................................. B62D 5/08
[52] U.S. Cl. ................................ 180/143; 74/388 PS; 91/375A; 91/426; 91/437; 137/625.24; 180/148; 251/297
[58] Field of Search ............... 180/143, 142, 141, 148, 180/132; 91/375 A, 426, 437; 137/625.24; 74/388 PS

[56] References Cited

U.S. PATENT DOCUMENTS

| | | | |
|---|---|---|---|
| 3,022,772 | 2/1962 | Zeigler | 121/41 |
| 3,043,276 | 7/1962 | Thompson | 121/38 |
| 3,749,112 | 7/1973 | Nishikawa et al. | 137/6 |
| 3,998,131 | 12/1976 | Adams | 41/372 |
| 4,034,825 | 7/1977 | Adams | 180/143 |
| 4,329,912 | 5/1982 | de Maight et al. | 91/420 |
| 4,429,621 | 2/1984 | Adams | 91/420 |
| 4,485,883 | 12/1984 | Duffy | 180/142 |
| 4,601,358 | 7/1986 | Kozuka et al. | 180/141 |
| 4,621,704 | 11/1986 | Kozuka | 180/143 |

FOREIGN PATENT DOCUMENTS 8605152 9/1986 Japan .................................. 180/143

Primary Examiner—John J. Love
Assistant Examiner—Mitchell J. Hill
Attorney, Agent, or Firm—Saul Schwartz

[57] ABSTRACT

A variable effort power steering system for an automobile includes a rotary valve power steering gear, a detent type variable effort detent system whereby a fluid detent pressure proportional to vehicle speed operates on a detent between an input member of the steering gear and an output member of the steering gear to prevent relative angular displacement therebetween until steering handwheel effort exceeds a threshold magnitude increasing with increasing detent pressure, and a shunt system between the two working chambers of the steering assist fluid motor. The shunt system includes a shunt valve in a shunt passage between the working chambers which is closed at zero or low vehicle speed and is progressively opened by detent pressure as vehicle speed increases whereby progressively more fluid is shunted from the active working chamber to the reservoir at higher vehicle speeds. By shunting fluid to the reservoir, the increase in steering assist boost pressure is rendered more linear relative to handwheel effort.

3 Claims, 2 Drawing Sheets

POWER STEERING SYSTEM

BACKGROUND OF THE INVENTION

1. Field of the Invention

This invention relates generally to automotive power steering systems and, more particularly, to variable effort power steering systems.

2. Description of the Prior Art

In typical power steering gears for automobiles, a valve which controls pressurization of the steering assist fluid motor is actuated by relative angular displacement between a spool rotatable with an input member of the steering gear and a sleeve rotatable with an output member of the steering gear. A torsion bar between the input and output members centers the sleeve and spool and resists such relative angular displacement between the input and output members. The resistance of the torsion bar is sensed by the driver as "road feel". The steering assist pressure in the fluid motor in such typical gears, referred to herein as boost pressure, increases exponentially relative to the increase in torsion bar resistance.

Because some drivers prefer more road feel at highway speeds than at zero or low vehicle speed, detent-type variable effort systems have been proposed wherein detents on the output member are urged by a detent fluid pressure into grooves in the input member. The detents connect the input member to the output member for unitary rotation until the handwheel effort applied by the driver exceeds a threshold magnitude proportional to the detent pressure at which instant the detents are cammed or ramped out of the grooves and the input member is released for rotation relative to the output member. Detent pressure typically increases with vehicle speed so that the threshold handwheel effort likewise increases with vehicle speed thereby yielding increased road feel at highway speeds. However, once the detents are ramped out of the grooves, boost pressure again increases exponentially relative to handwheel effort so that the driver may experience an abrupt change in the steering characteristic of the vehicle. A variable effort steering system according to this invention is a novel combination of a detent type variable effort system and a boost pressure modulation system which yields a substantially linear relationship between boost pressure and handwheel effort after the threshold handwheel effort is exceeded.

SUMMARY OF THE INVENTION

This invention is a new and improved variable effort power steering system for an automobile wherein, after the onset of power assist, a substantially linear relationship is achieved between manually applied handwheel effort and steering assist boost pressure. The new and improved steering system according to this invention includes a rotary valve steering gear, a detent type variable effort system on the steering gear which couples an input member of the steering gear to an output member of the steering gear until a threshold handwheel effort proportional to vehicle speed is applied, and a shunt system between the working chambers of a steering assist fluid motor which motor is controlled by the rotary valve of the steering gear. The shunt system includes a shunt duct between the fluid motor working chambers and a shunt valve in the shunt duct which normally blocks the shunt duct and progressively unblocks the shunt duct in proportion to vehicle speed. At zero or low vehicle speed, the shunt duct is blocked so that after the threshold handwheel effort is exceeded boost pressure increases exponentially relative to handwheel effort and the driver experiences minimum resistance at the handwheel. At higher vehicle speed, after the threshold handwheel effort is exceeded some boost pressure in the active one of the working chambers of the steering assist fluid motor is shunted to exhaust through the partially open shunt duct so that the otherwise exponential boost pressure curve is rendered more linear relative to handwheel effort. In a preferred embodiment of the steering system according to this invention, the shunt system is connected to the detent type variable effort system of the steering gear so that detent pressure proportional to vehicle speed operates on the shunt valve to progressively unblock the shunt duct in proportion to vehicle speed.

DESCRIPTION OF A PREFERRED EMBODIMENT

Figure 1:
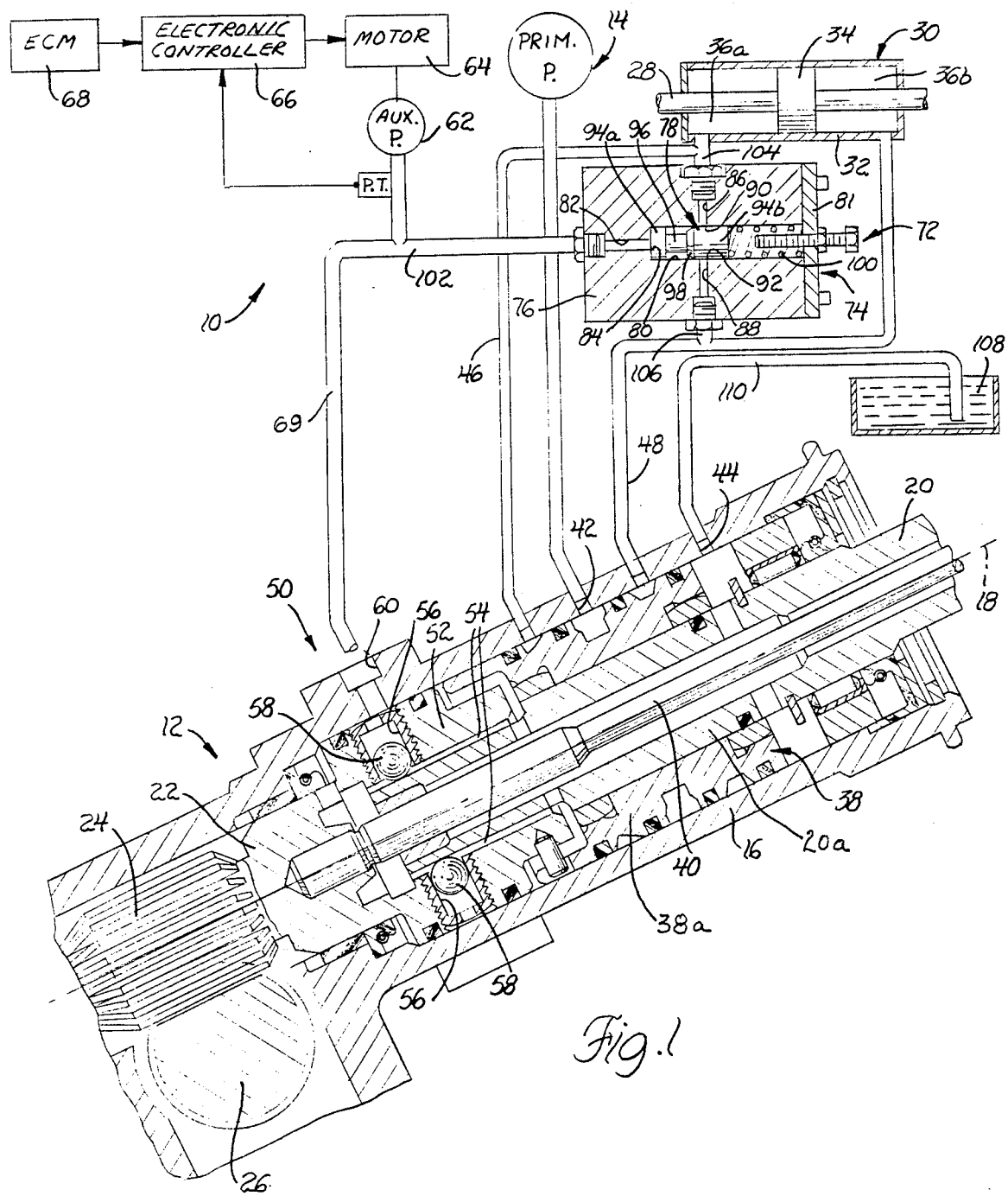
FIG. 1 is a schematic representation of the variable effort power steering system according to this invention showing in longitudinal cross-section the power steering gear, the detent type variable effort system, and the shunt valve.

Referring now to FIG. 1 of the drawings, a schematically illustrated automotive variable effort power steering system 10 according to this invention includes a power steering gear 12 and an engine driven power primary steering pump 14. The power steering gear 12 is is described in detail in U.S. patent application Ser. No. 074,087, filed July 16, 1987 by Schipper et al and assigned to the assignee of this invention. Briefly, the steering gear 12 includes a housing 16 defining an axis 18. A stub shaft 20 or input member of the steering gear 12 is supported on the housing 16 for rotation about the axis 18 and is connected at its right end, not shown, to the steering wheel of the vehicle referred to herein as the handwheel. A pinion shaft 22 or output member of the steering gear 12 is supported on the housing 16 for rotation about the axis 18 and has a pinion gear 24 thereon which meshes with rack teeth on a steering rack 26.

The steering rack is connected to the steered road wheels, not shown, of the vehicle and to a piston rod 28 of a steering assist fluid motor 30 of the steering system 10. The fluid motor 30 includes a cylinder 32 around the piston rod and a piston 34 on the piston rod within the cylinder which divides the latter into a pair of working chambers 36a and 36b. The fluid motor 30 provides steering assist when boost pressure exists in one of the working chambers 36a–b while the other is exhausted.

Pressurization and exhaust of the working chambers 36a–b is controlled by a rotary valve 38 in the housing 16 of the steering gear 12. The rotary valve includes a spool 20a rotatable with the stub shaft 20 and a sleeve 38a rotatable with the pinion shaft 22. The stub shaft is rotatable relative to the pinion shaft through a small included angle before a direct mechanical driving connection is established. A torsion bar 40 is connected at one end to the stub shaft 20 and at the other end to the pinion shaft 22. The torsion bar 40 defines an open center position of the control valve 38 wherein both working chambers 36a–b of the steering assist fluid motor are ported to a supply pressure port 42 on the housing 16 and to an exhaust port 44 on the housing 16. During relative angular displacement between the stub shaft and pinion shaft, the rotary valve ports the working chambers 36a–b of the steering assist fluid motor, in alternate fashion, to the supply pressure port 42 and to the exhaust port 44 through a pair of duct 46 and 48, respectively.

A representative detent type variable effort system 50 is disposed in the housing 16 of the steering gear between the stub shaft 20 and a detent support portion 52 of the pinion shaft 22. The variable effort system 50 is described in detail in the aforesaid U.S. patent application Ser. No. 074,087, and includes a plurality of longitudinal grooves 54 in the stub shaft and a corrresponding plurality of radial bores 56 in inserts on the detent support portion 52. The grooves 54 are aligned with the bores 56 in the open-center position of the rotary valve 38. A detent ball 58 is closely received in each radial bore 56 and is urged into the corresponding groove 54 by fluid detent pressure in the radial bores.

The fluid providing the detent pressure is directed into the radial bores 56 through a detent pressure port 60 on the housing 16. Detent pressure urges the detent balls 58 into the grooves 54 whereby the detent balls couple the stub shaft 20 to the pinion shaft 22 for unitary rotation until handwheel effort achieves a threshold magnitude proportion to detent pressure. At that instant, the detent balls 58 are cammed or ramped out of the grooves 54 and the rotary valve 38 is actuated by relative angular displacement between the stub shaft 20 and the pinion shaft 22. In the absence of detent pressure, the detent balls 58 provide no resistance to relative angular displacement between the stub shaft 20 and the pinion shaft 22.

The detent type variable effort system 50 further includes an auxiliary pump 62 driven by an electric motor 64 under the control of an electronic controller 66 and an electronic control module (ECM) 68 of the vehicle. The auxiliary pump 62 is connected to the detent pressure port 60 by a detent pressure duct 69. The ECM 68 provides an electronic signal to the controller 66 indicative of the forward speed of the vehicle. The controller 66 is programmed to energize the motor 64 to provide a range of unique, scheduled detent pressures over the full range of vehicle speeds. Generally, the scheduled detent pressures range from zero pressure at zero vehicle speed to about 250 psi at maximum vehicle speed.

Figure 2:
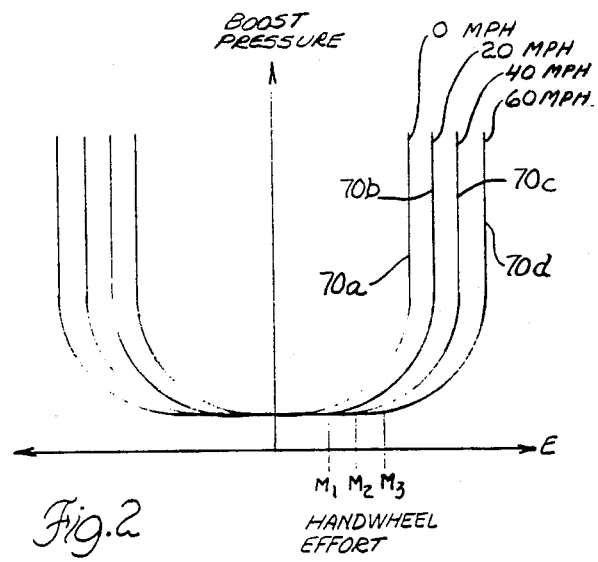
FIG. 2 is a graphic representation of the relationship between handwheel effort and steering assist boost pressure for only the detent type variable effort portion of the variable effort steering system according to this invention.

FIG. 2 graphically illustrates the relationship between boost pressure and handwheel effort for the steering gear 12 and only the representative detent type variable effort system 50. At zero vehicle speed, curve 70a, boost pressure begins increasing at very low levels of handwheel effort and increases exponentially so that power assist is maximized and handwheel effort is minimized. As vehicle speed increases, the scheduled detent pressure likewise increases. The effect of increasing detent pressure is to increase the handwheel effort necessary to initiate power assist. Graphically, curves 70b, 70c and 70d, FIG. 2, corresponding to progressively higher vehicle speeds illustrate the effect. On lowest speed curve 70b, boost pressure remains constant and low until handwheel effort exceeds a threshold magnitude $M_1$. Thereafter, boost pressure increases exponentially. Similarly, on higher speed curves 70c and 70d, boost pressure remains constant and low until handwheel effort exceeds higher threshold magnitudes $M_2$ and $M_3$, respectively, dictated by the higher detent pressures. Thereafter, boost pressure again increases exponentially.

Referring again to FIG. 1, the power steering system 10 further includes a shunt system 72. The shunt system includes a shunt valve 74 having a valve body 76 and a valve spool 78 slidably disposed in a bore 80 in the valve body closed at its right end by a cover 81. A pressure passage 82 in the valve body opens into the bore 80 at a pressure port 84. A first shunt passage 86 and a diametrically opposite second shunt passage 88 in the valve body open into the bore 80 at a pair of shunt ports 90 and 92, respectively. An exhaust passage not shown, in the valve body intersects the bore 80 to the right of the valve spool whereby leakage is discarded and atmospheric pressure is maintained.

The valve spool 78 has a pair of lands 94a and 94b separated by a smaller diameter neck 96. The spool is slidable in the bore 80 between a closed position, FIG. 1, wherein the land 94a abuts the left end of the bore 80 and the land 94b closes both of the shunt ports 90 and 92 and a plurality of open positions, not shown, wherein the land 94b progressively uncovers the shunt ports. The land 94b may be tapered, as at 98, for additional flow control. A spring 100 between the valve spool 78 and the cover 81 biases the spool to the closed position.

With continued reference to FIG. 1, the shunt system 72 further includes a detent pressure branch duct 102, a first shunt duct 104 and a second shunt duct 106. The detent pressure branch duct 102 extends between the detent pressure duct 69 of the variable effort detent system 50 and the pressure passage 82 in shunt valve 74 so that detent pressure is directed against the left side of the valve spool 78 through the pressure port 84. The first shunt duct 104 is connected to the first shunt passage 86 and to the duct 46. The second shunt duct 106 is connected to the shunt passage 88 and to the duct 48. The exhaust passage of the shunt valve, not shown, is connected to a low pressure fluid reservoir 108 to which the steering gear 12 is also connected through on exhaust duct 110, FIG. 1.

With respect only to the shunt system 72, at zero vehicle speed when detent pressure is zero, the valve spool 78 is in the closed position blocking the shunt ports 90 and 92 so that working chamber 36a is isolated from working chamber 36b. As soon as handwheel effort is applied at the steering wheel, one or the other of the working chambers 36a–b is ported to the power steering pump 14 to initiate power assist. Graphically, a curve 112a, FIG. 3, illustrates the relationship between boost pressure and handwheel effort for this condition and is identical to curve 70a, FIG. 2.

As vehicle speed and detent pressure increase, the valve spool 78 in the shunt valve 74 is shifted to the right against spring 100 through a plurality of open positions, not shown, wherein the shunt ports 90 and 92 are progressively further unblocked. Then, while power assist is initiated substantially at the onset of handwheel effort, some of the fluid ported by the rotary valve 38 from the power steering pump 14 to the active one of the working chambers 36a-b is diverted or shunted to the reservoir 108 through the shunt ducts 90 and 92 and the shunt valve 74. Accordingly, boost pressure does not increase exponentially as when the working chambers 36a-b are isolated but increases at a rate which depends at least in part on the size of the shunt ports 90 and 92 and the degree to which they are unblocked by the land 94b on the valve spool 78.

Figure 3:
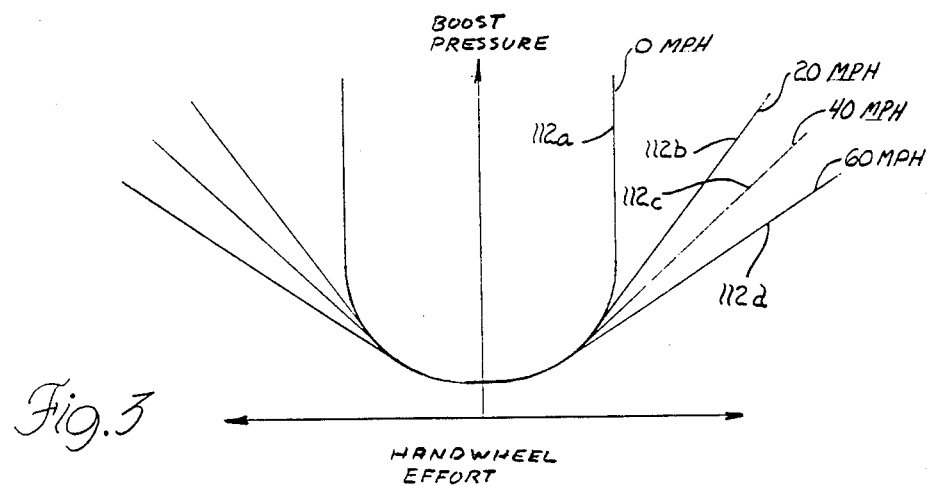
FIG. 3 is a graphic representation of the relationship between handwheel effort and steering assist boost pressure for only the shunt system portion of the variable effort steering system according to this invention.

Graphically, curves 112b, 112c and 112d, FIG. 3, illustrate relationships between boost pressure and handwheel effort which can be achieved with the shunt valve 74 at progressively increasing vehicle speed. In each case, boost pressure commences increasing substantially at the onset of handwheel effort. At increasing detent pressures characteristic of increasing vehicle speeds, the diversion of some pressure fluid through the shunt valve causes the boost pressure in each case to increase more linearly in relation to the handwheel effort. The slope of the curves 112a-b becomes progressively more flat at higher speeds due to the increased loss of pressure fluid through the progressively more open shunt valve 74.

The variable effort power steering system 10, including the detent system 50 and the shunt system 72, operates as follows. When the vehicle is standing still with the engine operating, detent pressure is zero and the valve spool 78 in the shunt valve 74 is in the closed position. At the onset of handwheel effort, maximum steering assist is achieved at minimum handwheel effort as the detent balls 58 are ramped out of the detent grooves 54 and boost pressure increases exponentially. A curve 114a, FIG. 4, corresponding to zero vehicle speed illustrates the effect and is identical to curves 70a and 112a, FIGS. 2 and 3, respectively.

Figure 4:
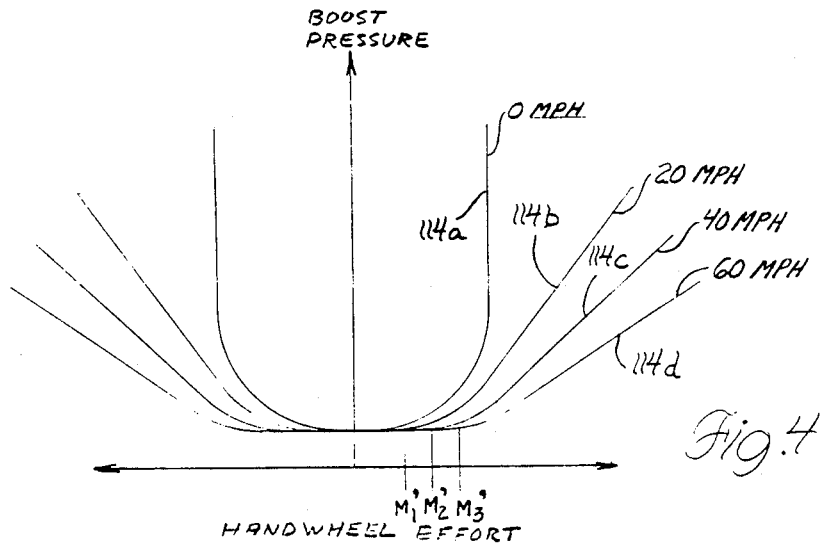
FIG. 4 is a graphic representation of the relationship between handwheel effort and steering assist boost pressure for the variable effort steering system according to this invention.

As vehicle speed increases, scheduled detent pressure behind the detent balls 58 and against the shunt valve spool 78 progressively increases. When the driver then applies handwheel effort, the detent balls resist relative angular displacement between the stub shaft and the pinion shaft until the threshold steering effort characteristic of that speed is exceeded. Accordingly, boost pressure remains low and there is no power assist until the threshold handwheel effort is exceeded. For example, on curves 114b-d, FIG. 4, representing increasing vehicle speeds corresponding to the speeds represented by the curves 70b-d and 112b-d in FIGS. 2 and 3, respectively, the threshold magnitudes at which power assist is initiated are represented by points $M_1'$, $M_2'$, and $M_3'$ which equal $M_1$, $M_2$ and $M_3$ in FIG. 2.

After the threshold handwheel effort for the particular vehicle speed is exceeded, the rotary valve 38 ports pressure fluid from the power steering pump 14 to one of the working chambers 36a-b of the fluid motor 30 and ports the other to the reservoir 108. Concurrently, the detent pressure acting on the shunt valve spool 78 positions the latter in the corresponding one of its open positions shunting pressure fluid from the active working cylinder to the reservoir. Accordingly, the increase in boost pressure in relation to handwheel effort follows the more linear characteristic described by the curves 112a-d in FIG. 3 rather than the exponential characteristic described by the curves 70b-d in FIG. 2. For example, on the curves 114b-d, the portions to the right of the handwheel efforts $M_1'$, $M_2'$ and $M_3'$ correspond in slope to the curves 112b-d, respectively, in FIG. 3.

The embodiments of the invention in which an exclusive property or privilege is claimed are defined as follows:

1. In a steering system for an automotive vehicle including
   a steering assist fluid motor having a pair of inversely variable volume working chambers,
   a primary power steering pump providing fluid at a variable system pressure, and
   a power steering gear connected to said power steering pump and to each of said working chambers of said steering assist fluid motor and including a rotary control valve having a spool connected to an input member of said power steering gear and a sleeve connected to an output member of said steering gear rotatable relative to said input member and a torsion rod between said input and said output members resiliently establishing an open center position of said rotary control valve,
   said rotary control valve in an open-center position thereof porting said power steering pump to each of said working chambers and to a low pressure reservoir,
   said rotary control valve porting said power steering pump to one of said working chambers and said reservoir to the other of said working chambers when said input member is angularly displaced relative to said output member so that said system pressure is minimum in said open center position of said rotary valve and increases substantially exponentially relative to the resilient resistance of said torsion rod,
   a variable effort system comprising:
   a detent means between said input member and said output member including a detent groove in said input member and a detent member slidably disposed on said output member and biased by a fluid detent pressure to a detenting position in said detent groove wherein said detent member couples said output member to said input member for unitary rotation,
   said detent groove being operative to ramp said detent member out of said detent groove to permit relative angular displacement between said input member and said output member when a manual handwheel effort having a threshold magnitude is applied to said input member,
   detent pressure means connected to said detent means and operative to provide a fluid detent pressure increasing in proportion to the speed of said vehicle from minimum at minimum speed to a maximum at maximum vehicle speed so that said threshold increases with increasing vehicle speed,
   means defining a shunt passage extending between said fluid motor working chambers operative to shunt fluid from said primary power steering pump to said reservoir thereby to reduce the steering assist provided by said fluid motor in proportion to the flow rate of fluid through said shunt passage, and
   a shunt valve means in said shunt passage operatively connected to said detect pressure means having a closed position blocking said shunt passage at detent pressures in the range of from zero to a low detent pressure corresponding to vehicle speeds in a range of from zero to a moderately low speed and progressively unblocking said shunt passage in proportion to detent pressure at detent pressures in the range of from said low detent pressure to a maximum detent pressure corresponding to vehicle speeds in a range of from said moderately low speed to a high speed characteristic of highway driving.

2. The variable effort system recited in claim 1 wherein
said detent member is a detent ball slidably disposed in a cylindrical detent bore in said output member of said steering gear.

3. The variable effort system recited in claim 2 wherein
said shunt valve means includes
a valve body defining a valve bore having a detent pressure port therein and a pair of shunt pressure ports therein,
means connecting each of said shunt pressure ports to said shunt passage in series with each other,
a valve spool slidably disposed in said valve bore having a first land cooperating with said valve bore in defining a detent pressure chamber connected to said detent pressure port and a second land spaced from said first land and defining therebetween a shunt chamber,
said second land overlapping and closing each of said pressure ports to block said shunt passage in a closed position of said valve spool and progressively exposing each of said shunt ports to said shunt chamber in each of a plurality of open positions of said valve spool,
spring means biasing said valve spool to said closed position, and
means communicating said detent pressure to said detent pressure port so that said detent pressure shifts said valve spool against said spring means from said closed position at zero detent pressure through said plurality of open positions as said detent pressure increases from zero to said maximum detent pressure.

* * * * *